(12) United States Patent
Cowan et al.

(10) Patent No.: US 11,284,560 B2
(45) Date of Patent: Mar. 29, 2022

(54) SINGULATING METER FEEDING MULTIPLE FURROW OPENERS

(71) Applicant: Bourgault Industries Ltd., St. Brieux (CA)

(72) Inventors: Ryan Cowan, St. Brieux (CA); Scot Jagow, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 295 days.

(21) Appl. No.: 16/680,817

(22) Filed: Nov. 12, 2019

(65) Prior Publication Data

US 2020/0146206 A1    May 14, 2020

(30) Foreign Application Priority Data

Nov. 13, 2018 (CA) ................................ CA 3023708

(51) Int. Cl.
*A01C 7/12* (2006.01)
*A01C 7/04* (2006.01)
(Continued)

(52) U.S. Cl.
CPC ............. *A01C 7/122* (2013.01); *A01C 5/062* (2013.01); *A01C 7/046* (2013.01); *A01C 7/082* (2013.01); *A01C 7/206* (2013.01)

(58) Field of Classification Search
CPC ......... A01C 5/062; A01C 5/064; A01C 7/044; A01C 7/046; A01C 7/082; A01C 7/088; A01C 7/121; A01C 7/122; A01C 7/206
See application file for complete search history.

(56) References Cited

U.S. PATENT DOCUMENTS

| | | | |
|---|---|---|---|
| 5,074,228 A | 12/1991 | Daws | |
| 6,928,939 B1 * | 8/2005 | Johnson | A01C 7/088 111/175 |

(Continued)

FOREIGN PATENT DOCUMENTS

| | | | | |
|---|---|---|---|---|
| WO | WO-8101093 A1 * | 4/1981 | | A01C 7/06 |
| WO | WO 2013/105021 A1 | 7/2013 | | |
| WO | WO-2019036523 A1 * | 2/2019 | | A01C 7/082 |

OTHER PUBLICATIONS

Australian Office Action, Examination report No. 1 for standard patent application, dated Aug. 24, 2020 for Application No. AU 2019264527, 4 pgs.

(Continued)

*Primary Examiner* — Alicia Torres
*Assistant Examiner* — Ian A Normile
(74) *Attorney, Agent, or Firm* — Frost Brown Todd LLC; Nicole M. Tepe (57) ABSTRACT

A seeding system for seeding large and small seeds includes a plurality of dispensing apparatuses mounted on an implement frame each comprising a first furrow opener mounted and a second furrow opener spaced laterally from the first furrow opener. A singulating meter is operative to dispense the large and small seeds through a meter discharge. A first seed conduit is connected to the first furrow opener and the meter discharge, and a second seed conduit is connected to the second furrow opener and the meter discharge. A selector is operative in a large seed mode to maintain the connection of the first seed conduit to the meter discharge while disconnecting the second seed conduit, and the selector is operative in a small seed mode to maintain the connection of the first seed conduit to the meter discharge while connecting the second seed conduit to the meter discharge.

22 Claims, 4 Drawing Sheets

(51) Int. Cl.
*A01C 7/08* (2006.01)
*A01C 7/20* (2006.01)
*A01C 5/06* (2006.01)

(56) References Cited

U.S. PATENT DOCUMENTS

| | | |
|---|---|---|
| 9,686,907 B2 | 6/2017 | Hui et al. |
| 9,699,953 B2 | 7/2017 | Jagow et al. |
| 2007/0079883 A1 | 4/2007 | Snipes et al. |
| 2009/0165686 A1* | 7/2009 | Memory ................ A01C 7/102 111/175 |
| 2014/0379228 A1 | 12/2014 | Batcheller et al. |
| 2015/0282422 A1 | 10/2015 | Hahn et al. |
| 2016/0106026 A1* | 4/2016 | Roberge ................ A01C 7/081 111/175 |
| 2018/0139894 A1 | 5/2018 | Jagow et al. |
| 2019/0320575 A1 | 10/2019 | Kowalchuk |

OTHER PUBLICATIONS

European Search Report and Written Opinion dated Apr. 15, 2020 for Application No. EP 19208666.8, 9 pgs.

\* cited by examiner

FIG. 10

SINGULATING METER FEEDING MULTIPLE FURROW OPENERS

CROSS-REFERENCE TO RELATED APPLICATIONS

This application claims priority to and benefit of Canada Patent Application Serial Number 3023708 filed Nov. 13, 2018, the contents of which are incorporated in their entirety for all purposes.

BACKGROUND

Agricultural crops are typically classified as row crops or solid seeded crops. Row crops such as corn, sunflowers, and the like are planted in relatively widely spaced rows, typically about 20-36 inches apart, while solid seeded crops such as grain, canola, and the like are planted in narrowly spaced rows that are typically only 6-15 inches apart.

For some agricultural crops such as corn it is desirable to plant the seeds equally spaced along furrows created in the soil by furrow openers such as discs or hoes. Such even spacing provides plant populations of even density that are selected to maximize yields for a particular situation. In seeding implements for such crops a singulating meter is typically provided for each furrow opener, and a seed container is mounted above each meter to supply seed to the meter by gravity. Typically such singulating meters have been mounted on the furrow opener itself, however United States Published Patent Application Number 20180139894 of Jagow et al. discloses an implement where the singulating meters are mounted on the implement frame.

U.S. Pat. No. 9,699,953 to Jagow, et al. discloses a seeding implement with a plurality of furrow openers spaced across the implement width, and where all furrow openers are fed by a volume metering system when seeding seeds like canola and grain, and where only selected furrow openers are fed by a corresponding number of singulating meters when seeding corn and like seeds.

U.S. Pat. No. 9,686,907 to Hui, et al. discloses a rotary flow divider for an agricultural product distribution system which delivers seeds from a volumetric metering system to two furrow openers or to a selected single one of the furrow openers to change row spacing of seeded crops. United States Published Patent Application Number 2019/0320575 of Kowalchuk discloses a singulating meter feeding singulated seeds to a valve which alternately delivers the seeds to two furrow openers such that one seed goes to one furrow opener and the next seed dispensed by the singulating meter goes to the other furrow opener.

Hybrid and genetically modified seeds such as are commonly used for crops like canola are costly, and so reducing the seeding rate for such crops is generally beneficial providing yields can be maintained. The minimum recommended plant population for canola to maintain yield is 5 plants per square foot. To allow for seed and plant mortality due to factors such as mechanical seed damage, poor seed placement, frost, and insects the recommended target plant population for canola is between 7-10 plants per square foot.

Although canola seeds for example are not presently typically seeded at an even spacing with singulating meters, the seeds are very small and metering them evenly and consistently at low rates is problematic. Singulating metering of seeds like canola may reduce mechanical seed damage and improve metering accuracy and placement allowing for reduced seeding rate without compromising the minimum recommended plant population.

SUMMARY OF THE INVENTION

This disclosure relates to the field of agricultural implements and in particular a seeding apparatus with singulating meters selectively feeding a plurality of furrow openers.

The present disclosure provides a seeding apparatus that overcomes problems in the prior art.

In a first embodiment the present disclosure provides a seeding system for seeding large and small seeds, the system comprising a plurality of dispensing apparatuses mounted on an implement frame and laterally spaced along a width of the implement frame, each dispensing apparatus comprising a first furrow opener mounted on the implement frame and a second furrow opener mounted on the implement frame spaced laterally from the first furrow opener. A singulating meter is operative to dispense the large and small seeds through a meter discharge. Each singulating meter is configured when in a large seed mode to rotate a large seed disc to dispense the large seeds, and is configured when in a small seed mode to rotate a small seed disc to dispense the small seeds. A first seed conduit has an output end connected to the first furrow opener and an input end connectable to the meter discharge, and a second seed conduit has an output end connected to the second furrow opener and an input end connectable to the meter discharge. A selector is operative in a large seed mode to maintain the connection of the input end of the first seed conduit to the meter discharge while disconnecting the input end of the second seed conduit from the meter discharge, and the selector is operative in a small seed mode to maintain the connection of the input end of the first seed conduit to the meter discharge while connecting the input end of the second seed conduit to the meter discharge.

In a second embodiment the present disclosure provides a method of seeding small seeds at a first row spacing and large seeds at a second row spacing that is twice the first row spacing. The method comprises mounting a plurality of dispensing apparatuses laterally spaced along a width of an implement. Each dispensing apparatus comprises a first furrow opener mounted on the implement frame and a second furrow opener mounted on the implement frame spaced laterally from the first furrow opener a distance equal to the first row spacing; a singulating meter operative to dispense the large and small seeds through a meter discharge; wherein each singulating meter is configured when in a large seed mode to rotate a large seed disc to dispense the large seeds, and is configured when in a small seed mode to rotate a small seed disc to dispense the small seeds; a first seed conduit, wherein an output end of the first seed conduit is connected to the first furrow opener and an input end of the first seed conduit is connectable to the meter discharge; a second seed conduit, wherein an output end of the second seed conduit is connected to the second furrow opener and an input end of each second seed conduit is connectable to the meter discharge. The method then comprises seeding the small seeds at the first row spacing by, in each dispensing apparatus, operating the singulating meter in the small seed mode and maintaining the first and second seed conduits open to provide a path for the small seeds from the meter discharge to both the first and second furrow openers, and seeding the large seeds at the second row spacing by, in each dispensing apparatus, operating the singulating meter in the large seed mode and maintaining the first seed conduit open to provide a path for the large seeds from the meter discharge to the first furrow openers while blocking the input end of the second seed conduit.

Singulating meters can be configured to dispense seeds of different sizes. Singulating meters could be provided for seeding canola consistently at reduced rates however such meters are relatively costly, and since canola is typically seeded on relatively narrow row spacings of 10-15 inches a seeding implement with a width of 60 feet, which is fairly common, would require about 60 singulating meters.

Although not benefiting significantly from an exact and consistent seed spacing as is the case with corn, singulating meters would provide the benefits of gentler and more accurate metering for canola and other seeds that could allow for reduced seeding rates. The present disclosure provides considerable savings and versatility by providing a seeding apparatus where each singulating meter feeds a seed conduit that can be configured to feed either a single furrow opener, for seeding corn seeds for example, or a plurality of furrow openers for seeding seeds like canola seeds.

A seeding implement of the present disclosure then will have a plurality of furrow openers spaced across its width at an opener spacing suitable for canola of 10-15 inches, and where alternate furrow openers can be inoperative such that operative furrow openers will provide a row spacing suitable for corn of 20-30 inches. When seeding canola each singulating meter will dispense seeds to two furrow openers through a split conduit arrangement such as a Y-split conduit. The seeds cannot be exactly split between each furrow opener being fed, but the deviation will not significantly affect yields.

When seeding corn each singulating meter will dispense seeds to a single furrow opener at a consistent spacing from the singulating meter through a single seed conduit to the single furrow opener.

The present disclosure provides an economical seeding implement for gently seeding canola at reduced rates with a singulating meter feeding two rows, and thus one half the number of singulating meters required. Also, the same implement can be used to seed corn seeds at a row spacing twice that of the canola row spacing.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
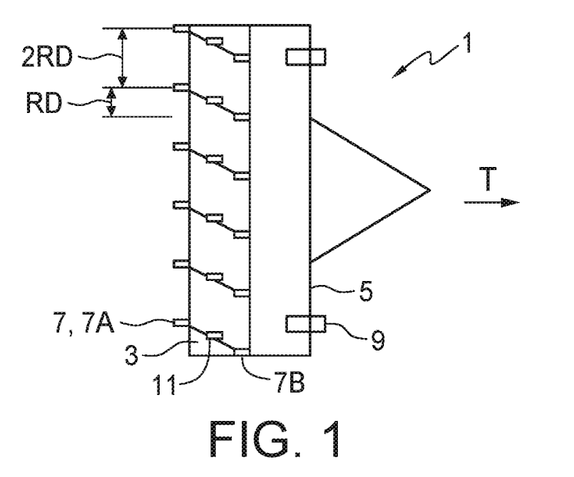
FIG. 1 is a schematic top view of an embodiment of the seeding system of the present disclosure.
Figure 2:
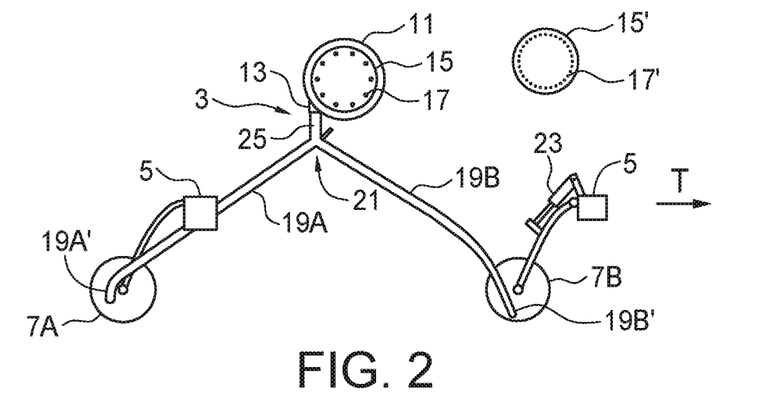
FIG. 2 is a schematic side view of the embodiment of FIG. 1.
Figure 3:
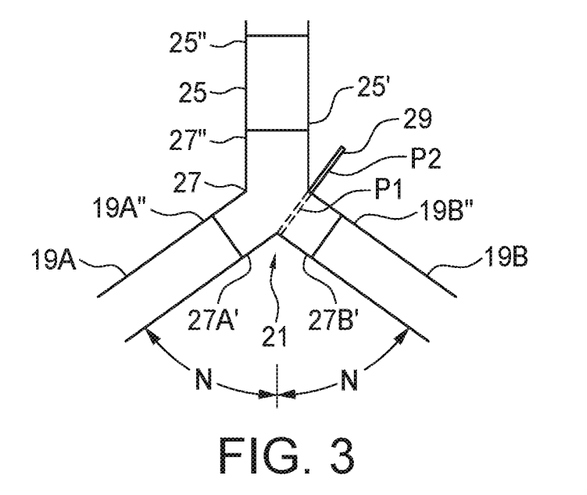
FIG. 3 is a schematic sectional side view of the Y fitting and diversion plate of the embodiment of FIG. 1.

FIGS. 1-3 schematically illustrate an embodiment of a seeding system 1 of the present disclosure for seeding large and small seeds. The system 1 comprises a plurality of dispensing apparatuses 3 mounted on an implement frame 5 and laterally spaced along a width of the implement frame 5. Each dispensing apparatus 3 comprises a first furrow opener 7A mounted on the implement frame 5 and a second furrow opener 7B mounted on the implement frame 5 spaced laterally from the first furrow opener 7A by a row spacing distance RD. The dispensing apparatuses 3 are evenly spaced across the width of the implement frame so that the distance between the furrows made by the first furrow openers 7A on adjacent dispensing apparatuses 3 and the furrows made by the second furrow openers 7B on adjacent dispensing apparatuses 3 is twice the row spacing distance RD, or 2RD.

The implement frame 5 is mounted on wheels 9 for travel in an operating travel direction T. The first furrow opener 7A of each dispensing apparatus 3 is shown mounted along a rear row on the implement frame 5 and the second furrow opener 7B of each dispensing apparatus 3 is shown mounted along a front row on the implement frame 3. In the illustrated system 1, when in operation moving along a field surface in the operating travel direction T the first furrow openers 7A will create furrows that are between adjacent second furrow openers 7B. It is also contemplated that the furrow openers 7 could be mounted on a single row however in most situations it is contemplated that the first and second furrow openers 7A, 7B will be spaced longitudinally fore and aft in the operating travel direction T as well as laterally as shown in FIG. 1. It is also contemplated that the furrow openers could be mounted on three or more rows with the dispensing apparatuses arranged accordingly with adjacent furrow openers which may be on any row.

In each dispensing apparatus 3 a singulating meter 11 is operative to dispense the large and small seeds through a meter discharge 13. Each singulating meter includes a large seed disc 15 and a small seed disc 15'. The large seed disc 15 defines large seed apertures 17 for dispensing large seeds such as corn, and the small seed disc 15' defines small seed apertures 17' for dispensing small seeds such as canola. Each singulating meter 11 is configured when in a large seed mode to rotate the large seed disc 15 to dispense the large seeds, and is configured when in a small seed mode to rotate the small seed disc 15' to dispense the small seeds. The terms "large" and "small" are not meant to be limiting but are used to distinguish those seeds that are seeded on a wide row spacing, typically but not necessarily larger seeds, and those seeds that are seeded on a narrow row spacing, typically but not necessarily smaller seeds.

A first seed conduit 19A has an output end 19A' connected to the first furrow opener 7A and an input end 19A" connectable to the meter discharge 13. A second seed conduit 19B has an output end 19B' connected to the second furrow opener 7B and an input end 19B" connectable to the meter discharge 13 through a selector 21. The selector 21 is operative in a large seed mode to maintain the connection of the input end 19A" of the first seed conduit 19A to the meter discharge 13 while disconnecting the input end 19B" of the second seed conduit 19B from the meter discharge 13.

Thus in the large seed mode, the large seeds are delivered only to the first furrow openers 7A mounted along the rear of the implement frame 5, while no seeds are delivered to the second furrow openers 7B mounted along the front of the implement frame 5. The large seeds are thus deposited into furrows spaced apart by a distance equal to twice the lateral shank spacing RD of the first and second furrow openers 7A, 7B on each dispensing apparatus 3. A furrow opener lift 23 is operative to maintain the second furrow openers 7B above the ground when the selector 21 is operated in the large seed mode. The first furrow opener 7A, which is always delivering large or small seeds, could also be located on the front row with the second furrow opener 7B on the rear row.

Such a wide seed row spacing is suitable for large seed crops like corn, while small seed crops like canola require a narrow seed spacing of 10 to 15 inches. Thus the dispensing apparatus 3 can be configured with a lateral row spacing RD of 12 inches suitable for canola, and which in turn will provide a wide row spacing 2RD that is 24 inches, suitable for corn.

Singulating meters such as used in the disclosed dispensing apparatus 1 dispense seeds one at a time at a rate proportional to the ground speed of the implement frame 5 to achieve a substantially constant spacing of the seeds along the row, which constant spacing has been found to improve the yields of corn. Canola has not been found to exhibit the same benefits from constant seed spacing in the seed row, however using a singulating meter does have benefits in reducing clumping of seeds, where canola seeds tend to stick together. The more precise dispensing of the singulating meter also can provide similar yields with reduced seeding rates.

To seed small seeds such as canola at the narrow row spacing RD the selector 21 is operated in a small seed mode to maintain the connection of the input end 19A" of the first seed conduit 19A to the meter discharge 13 while also connecting the input end 19B" of the second seed conduit to the meter discharge.

In the system 3 of FIGS. 2 and 3 the selector 21 comprises a discharge conduit 25 connected at an input end 25" to the meter discharge 13 to receive the large and small seeds. The singulating meter 11 is mounted above and between the first and second furrow openers 7A, 7B and the discharge conduit 25 is oriented substantially vertically and the first and second seed conduits 19A, 19B slope downward and away from the selector 21 to the respective first and second furrow openers 7A, 7B at substantially the same angle.

A Y fitting 27 comprises a Y input opening 27" connected to an output end 25' of the discharge conduit 25, a first Y output opening 27A' connected to the input end 19A" of the first seed conduit 19A, and a second Y output opening 27B' connected to the input end 19B" of the second seed conduit 19B. The selector 21 is operative in the large seed mode to close the second Y output opening 27B' with the first Y output opening 27A' open, and the selector 21 is operative in the small seed mode to open the second Y output opening 27B' with the first Y output opening 27A' maintained open.

The illustrated selector 21 comprises a diversion plate 29 movable from a closed position P1 blocking the second Y output opening 27B' when the selector 21 is operating in the large seed mode, to an open position P2 where the second Y output opening 27B' is open when the selector 21 is operating in the small seed mode. The Y fitting 27 is configured such that the first and second seed conduits 19A, 19B are oriented at substantially the same angle N with respect to the discharge conduit such that small seeds falling down the discharge conduit 25 pass substantially equally into the first and second seed conduits 19A, 19B.

Figure 4:
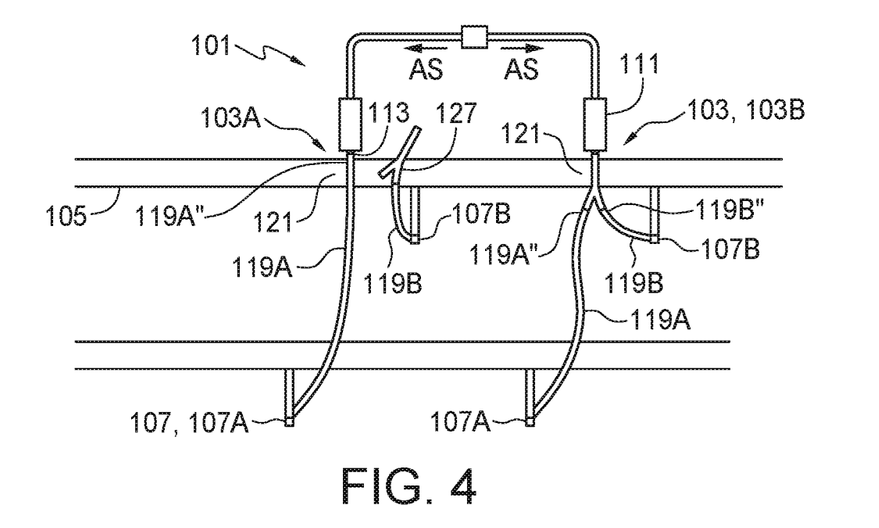
FIG. 4 is a schematic top view of an alternate embodiment of the seeding system of the present disclosure showing one dispensing apparatus in the large seed mode and one dispensing apparatus in the small seed mode.

The distribution schematically illustrated in the apparatus 1 uses a gravity drop from the singulating meter 9 to the furrow openers 7 however in practice it can be difficult to realize a system using a gravity drop. FIGS. 4-7 schematically illustrate an alternate embodiment of a seeding system 101 of the present disclosure for seeding large and small seeds. FIG. 4 schematically illustrates an implement frame 105 with two dispensing apparatuses 103 mounted thereon.

In the system 101, in each dispensing apparatus 103 the singulating meter 111 discharges the large and small seeds through the meter discharge 113 into a pressurized air stream AS flowing in a discharge conduit 125 that carries the seeds through the selector 121 to the connected furrow openers 107. The selector 121 here comprises a releasable connector 131 on the discharge conduit 125 connected to the meter discharge 113. In the illustrated selector 121 the releasable connection 131 is provided simply as illustrated in FIG. 6 by inserting the input end 119A" of the first seed conduit 119A into the output end of a discharge conduit 125.

Figure 5:
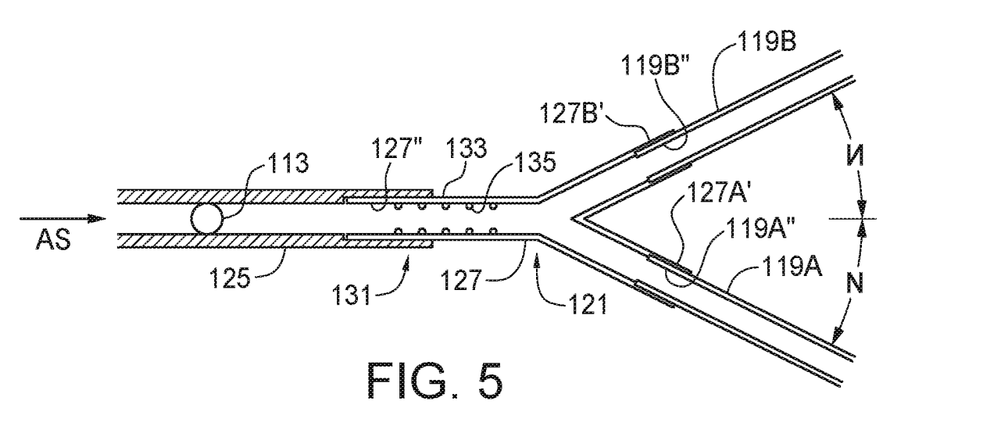
FIG. 5 is a schematic sectional top view of the selector of the dispensing apparatuses of FIG. 4 in the small seed mode.

The selector 121 further comprises a Y fitting 127 comprising a Y input opening 127" configured to releasably connect to the releasable connector 131 on the meter discharge 113, again simply as illustrated in FIG. 5 by inserting the input opening 127" of the Y fitting 127 into the output end of the discharge conduit 125.

A first Y output opening 127A' is configured to releasably connect to the input end 119A" of the first seed conduit 119A, and a second Y output opening 127B' is connected to the input end 119B" of the second seed conduit 119B.

Figure 6:
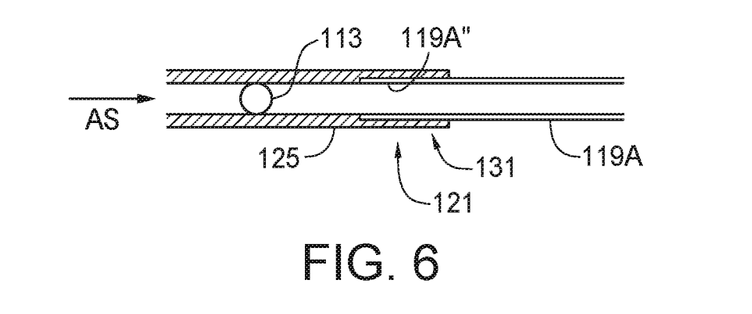
FIG. 6 is a schematic is a schematic sectional top view of the selector of the dispensing apparatuses of FIG. 4 in the large seed mode.

The selector 121 is operated in the large seed mode as shown in FIG. 6 by connecting the input end 119A" of the first seed conduit 119A to the releasable connector 131 on the meter discharge. The Y fitting 127 and connected second seed conduit 119B are typically sealed off and secured to the implement frame 105. Dispensing apparatus 103A in FIG. 4 is shown with the selector 121 in the large seed mode.

The selector 121 is operated in the small seed mode as shown in FIG. 5 by connecting the Y input opening 127" of the Y fitting 127 to the releasable connector 131 on the meter discharge 113 and connecting the first Y output opening 127A' to the input end 119A" of the first seed conduit 119A while maintaining the connection of the second Y output opening 127B' to the input end 119B" of the second seed conduit 119B. Dispensing apparatus 103B in FIG. 4 is shown with the selector 121 in the small seed mode.

The first and second Y output openings 127A', 127B' are oriented at substantially the same angle with respect to the Y input opening 127" to facilitate substantially equal flow of the air stream and small seeds carried therein to each of the furrow openers 107. To further facilitate such substantially equal flow the Y fitting 127 comprises a centering conduit 133 between the Y input opening 127" and the Y output openings 127A', 127B', with centering projections 135 extending from an inner surface of the centering conduit 133.

While the Y fitting 27 is shown in FIG. 2 in a vertical orientation, the Y fitting 127 is shown in FIG. 4 in a horizontal orientation. The first and second Y output openings 127A', 127B' are oriented in substantially the same horizontal plane, as this orientation improves the equal distribution of small seeds into each of the Y output openings as the effect of gravity is removed.

Figure 7:
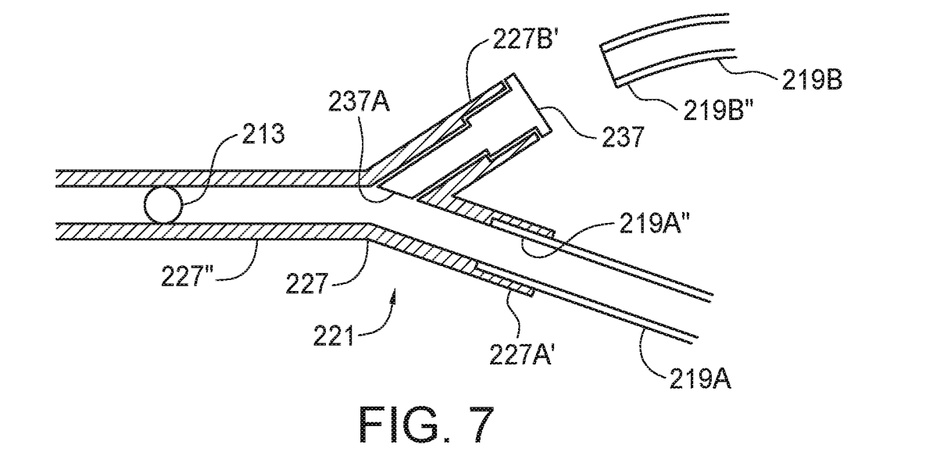
FIG. 7 is a schematic sectional top view of an alternate selector comprising a plug.

FIG. 7 schematically illustrates an alternate selector 221 where the Y input opening 227" of the Y fitting 227 is connected to the meter discharge 213. The input end 219B" of the second seed conduit 219B is releasably connected to the second Y output opening 227B', and the selector 221 comprises a plug 237 configured to insert into the second Y output opening 227B". The inner end 237A of the plug 237 is configured to provide a substantially smooth wall joining the Y input opening 227" and the first Y output opening 227A'. The selector 221 is operated in the large seed mode by disconnecting the input end 219B" of the second seed conduit 219B from the second Y output opening 227B' and securing the plug 237 in the second Y output opening 227B'. The input end 219A" of the first seed conduit 219A remains connected to the first Y output opening 227A' when the selector 221 is in both the large and small seed modes.

Figure 8:
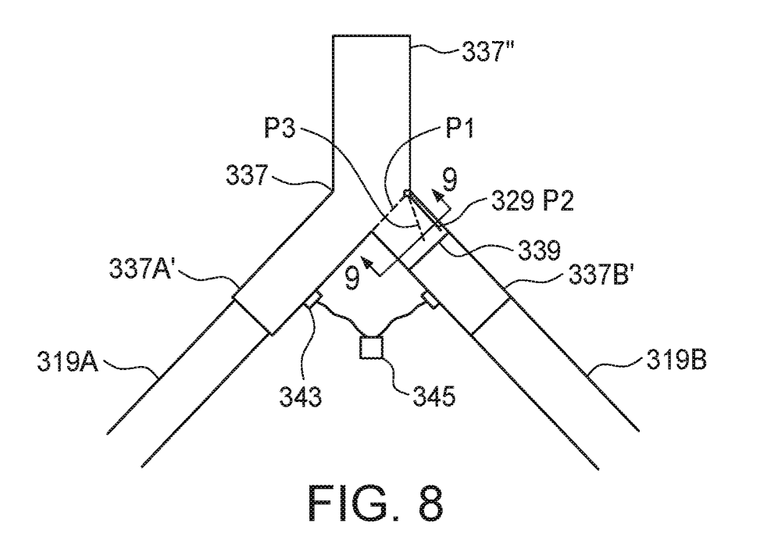
FIG. 8 is a schematic top view of an alternate Y fitting comprising a rectangular section housing a diversion plate.
Figure 9:
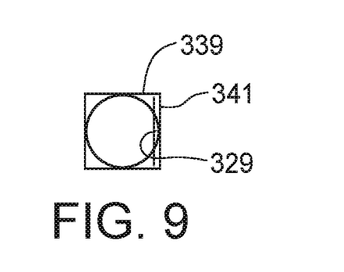
FIG. 9 is a schematic sectional view along line 9-9 in FIG. 8

FIGS. 8 and 9 schematically illustrate an alternate Y fitting 337 comprising a cylindrical connection from the Y input opening 337" to the first Y output opening 337A', and a rectangular section 339, typically square as shown in FIG. 9, between the Y input opening 337" and the second Y output opening 337B'. A diversion plate 329 is pivotally attached to rectangular section 339 such that the diversion plate 339 is movable from the closed position P1 extending across the rectangular section 339 when the selector is operating in the large seed mode, to the open position P2 lying substantially flat against a sidewall 341 of the rectangular section 339 when the selector is operating in the small seed mode.

Also the diversion plate 329 is movable to an intermediate position P3 selected to substantially equalize a flow of pressurized air through each of the first and second seed conduits 319A, 319B. In the version of FIG. 8, the cross-sectional area of the second seed conduit 319B is greater than a cross-sectional area of the first seed conduit 319A, such that more air, and thus more small seeds, will tend to flow through the second seed conduit 319B. With the diversion plate 329 oriented as shown in the path of air flow through the second seed conduit 319B, the diversion plate 329 can then be moved to an intermediate position P3 selected to partially block air flow to the second seed conduit 319B to substantially equalize the flow of pressurized air, and thus small seeds, through each of the first and second seed conduits 319A, 319B.

Flow sensors 343 can be placed to measure the flow of small seeds through each of the first and second seed conduits 319A, 319B, and connected to a controller 345 operative to adjust the intermediate position of the diversion plate 329. It is also contemplated that the sensors 343 could measure air pressure instead of seed flow, and the diversion plate 329 could be moved to equalize pressure in each of the first and second flow paths.

Figure 10:
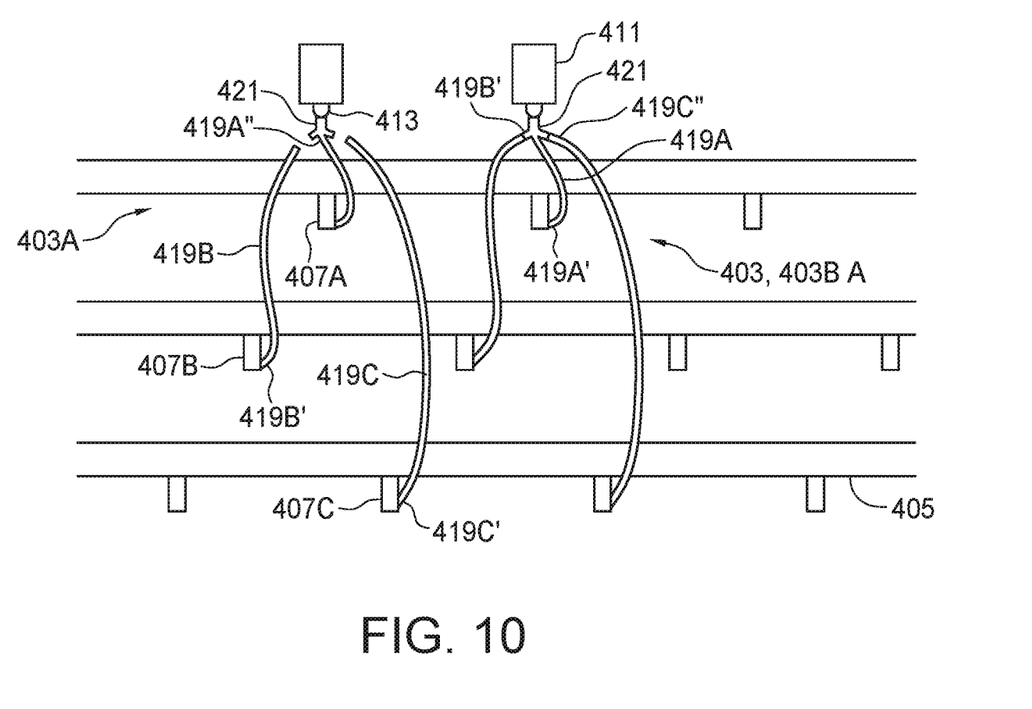
FIG. 10 is a schematic top view of an alternate embodiment of the seeding system of the present disclosure showing two dispensing apparatuses, each with three furrow openers, and with one dispensing apparatus in the large seed mode and one dispensing apparatus in the small seed mode.

FIG. 10 schematically illustrates an implement frame 405 with two dispensing apparatuses 403 mounted thereon. In this version each dispensing apparatus comprises a third furrow opener 407C spaced laterally from the first and second furrow openers 407A, 407B and a third seed conduit 419C in addition to the first and second seed conduits 419A, 419B. The furrow openers are shown on three rows however could be arranged on more or less rows.

The output end 419C' of the third seed conduit 419C is connected to the third furrow opener 407C and an input end 419C" of the third seed conduit 419C is connectable to the meter discharge 413 of the singulating meter 411. The dispensing apparatus 403A is shown with the selector 421 in the large seed mode while the dispensing apparatus 403B is shown with the selector 421 in the small seed mode.

The selector 421 is operative in the large seed mode to maintain the connection of the input end 419A" of the first seed conduit 419A to the meter discharge 413 while disconnecting the input end 419B" of the second seed conduit 419B from the meter discharge 413 and while disconnecting the input end 419C" of the third seed conduit 419C from the meter discharge 413. The selector 421 is operative in the small seed mode to maintain the connection of the input end 419A" of the first seed conduit 419A to the meter discharge 413 while connecting the input end 419B" of the second seed conduit 419B to the meter discharge 413 and connecting the input end 419C" of the third seed conduit 419C to the meter discharge 413.

The present disclosure also provides a method of seeding small seeds at a first row spacing and large seeds at a second row spacing that is twice the first row spacing. The method comprises mounting a plurality of dispensing apparatuses 3 laterally spaced along a width of an implement frame 5, each dispensing apparatus 3 comprising a first furrow opener 7A mounted on the implement frame and a second furrow opener 7B mounted on the implement frame spaced laterally from the first furrow opener a distance equal to the first row spacing RD, a singulating meter 11 operative to dispense the large and small seeds through a meter discharge 13, wherein each singulating meter is configured when in a large seed mode to rotate a large seed disc 15 to dispense the large seeds, and is configured when in a small seed mode to rotate a small seed disc 15' to dispense the small seeds, a first seed conduit 19A, wherein an output end 19A' of the first seed conduit 19A is connected to the first furrow opener 7A and an input end 19A" of the first seed conduit 19A is connectable to the meter discharge 13, a second seed conduit 19B wherein an output end 19B' of the second seed conduit 19B is connected to the second furrow opener 7B and an input end 19B" of each second seed conduit 19B is connectable to the meter discharge 13; seeding the small seeds at the first row spacing RD by, in each dispensing apparatus 3, operating the singulating meter 11 in the small seed mode and maintaining the first and second seed conduits 19A, 19B open to provide a path for the small seeds from the meter discharge 13 to both the first and second furrow openers 7A, 7B; seeding the large seeds at the second row spacing 2RD by, in each dispensing apparatus 3, operating the singulating meter 11 in the large seed mode and maintaining the first seed conduit 19A open to provide a path for the large seeds from the meter discharge 13 to the first furrow openers 7A while blocking the input end 19B" of the second seed conduit 19B.

The present disclosure provides an economical seeding system for seeding large and small seeds. Canola for example can be seeded at somewhat reduced rates with a singulating meter feeding two rows, and thus one half the number of singulating meters required. Also the same implement can be used to seed large seeds, such as corn, at a row spacing twice that of the canola row spacing.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seeding system for seeding large and small seeds, the system comprising a plurality of dispensing apparatuses mounted on an implement frame and laterally spaced along a width of the implement frame, each dispensing apparatus comprising:
  a first furrow opener mounted on the implement frame and a second furrow opener mounted on the implement frame spaced laterally from the first furrow opener;
  a singulating meter operative to dispense the large and small seeds through a meter discharge;
  wherein each singulating meter is configured when in a large meter seed mode to rotate a large seed disc to dispense the large seeds, and is configured when in a small meter seed mode to rotate a small seed disc to dispense the small seeds;
  a first seed conduit, wherein an output end of the first seed conduit is connected to the first furrow opener and an input end of the first seed conduit is connected to the meter discharge such that during operation an open path is maintained through the first seed conduit between the meter discharge and the first furrow opener;
  a second seed conduit, wherein an output end of the second seed conduit is connected to the second furrow opener and an input end of the second seed conduit is connectable to the meter discharge; and
  a selector operative in a large selector seed mode to disconnect the input end of the second seed conduit from the meter discharge; and
  wherein the selector is operative in a small selector seed mode to connect the input end of the second seed conduit to the meter discharge.

2. The system of claim 1 wherein the selector comprises:
  a Y fitting comprising a Y input opening connected to the meter discharge and a first Y output opening connected to the input end of the first seed conduit, and a second Y output opening connected to the input end of the second seed conduit;
  wherein the selector is operative in the large selector seed mode to close the second Y output opening; and
  wherein the selector is operative in the small selector seed mode to open the second Y output opening.

3. The system of claim 2 wherein the Y fitting is configured such that the first and second seed conduits are oriented at substantially the same angle with respect to the meter discharge.

4. The system of claim 2 wherein the input end of the second seed conduit is releasably connected to the second Y output opening, and wherein the selector comprises a plug configured to insert into the second Y output opening, and wherein an inner end of the plug is configured to provide a substantially smooth wall joining the Y input opening and the first Y output opening, and wherein the selector is operated in the large selector seed mode by disconnecting the input end of the second seed conduit from the second Y output opening and securing the plug in the second Y output opening.

5. The system of claim 2 wherein the selector comprises a diversion plate movable from a closed position blocking the second Y output opening, to an open position where the second Y output opening is open.

6. The system of claim 2 comprising a pressurized air source operative to direct a pressurized air stream through the meter discharge and selector to the first and second furrow openers, and comprising centering projections extending from an inner surface of the Y fitting between the Y input opening and the first and second Y output openings.

7. The apparatus of claim 6 wherein the Y fitting comprises a cylindrical connection from the Y input opening to the first Y output opening, and comprises a rectangular section between the Y input opening and the second Y output opening, and wherein a diversion plate is pivotally attached to rectangular section such that the diversion plate is movable from the closed position extending across the rectangular section, to the open position lying substantially flat against a sidewall of the rectangular section.

8. The apparatus of claim 7 wherein a cross-sectional area of the second seed conduit is greater than a cross-sectional area of the first seed conduit, and wherein the diversion plate is movable to an intermediate position selected to substantially equalize a flow of pressurized air through each of the first and second seed conduits.

9. The system of claim 8 comprising flow sensors operative to measure the flow of small seeds through each of the first and second seed conduits, and connected to a controller operative to adjust the intermediate position of the diversion plate.

10. The system of claim 6 wherein the first and second Y output openings are oriented in substantially the same horizontal plane.

11. The system of claim 1 wherein the singulating meter is mounted above and between the first and second furrow openers and the meter discharge is oriented substantially vertically and the first and second seed conduits slope downward and away from the selector to the respective first and second furrow openers at substantially the same angle.

12. The system of claim 1 wherein the singulating meter discharges the large and small seeds into a pressurized air stream and wherein the selector comprises:
  a releasable connector on the meter discharge;
  a Y fitting comprising:
    a Y input opening configured to releasably connect to the releasable connector on the meter discharge;
    a first Y output opening configured to releasably connect to the input end of the first seed conduit;
    a second Y output opening connected to the input end of the second seed conduit;
  wherein the selector is operated in the large selector seed mode by connecting the input end of the first seed conduit to the releasable connector on the meter discharge; and
  wherein the selector is operated in the small selector seed mode by connecting the Y input opening of the Y fitting to the releasable connector on the meter discharge and connecting the first Y output opening to the input end of the first seed conduit while maintaining the connection of the second Y output opening to the input end of the second seed conduit.

13. The system of claim 12 wherein the first and second Y output openings are oriented at substantially the same angle with respect to the Y input opening.

14. The system of claim 12 wherein the Y fitting comprises a centering conduit between the Y input opening and the first and second Y output openings, and comprising centering projections extending from an inner surface of the centering conduit.

15. The system of claim 1 comprising a furrow opener lift operative to maintain the second furrow openers above the ground when the selector is operated in the large selector seed mode.

16. The system of claim 1 wherein:

each dispensing apparatus comprises a third furrow opener spaced laterally from the first and second furrow openers and a third seed conduit, wherein an output end of the third seed conduit is connected to the third furrow opener and an input end of the third seed conduit is connectable to the meter discharge;

the selector is operative in the large selector seed mode to maintain the connection of the input end of the first seed conduit to the meter discharge while disconnecting the input end of the second seed conduit from the meter discharge and while disconnecting the input end of the third seed conduit from the meter discharge; and the selector is operative in the small selector seed mode to maintain the connection of the input end of the first seed conduit to the meter discharge while connecting the input end of the second seed conduit to the meter discharge and connecting the input end of the third seed conduit to the meter discharge.

17. A method of seeding small seeds at a first row spacing and large seeds at a second row spacing that is twice the first row spacing, the method comprising:

mounting a plurality of dispensing apparatuses laterally spaced along a width of an implement frame, each dispensing apparatus comprising:

a first furrow opener mounted on the implement frame and a second furrow opener mounted on the implement frame spaced laterally from the first furrow opener a distance equal to the first row spacing;

a singulating meter operative to dispense the large and small seeds through a meter discharge;

wherein each singulating meter is configured when in a large meter seed mode to rotate a large seed disc to dispense the large seeds, and is configured when in a small meter seed mode to rotate a small seed disc to dispense the small seeds;

a first seed conduit, wherein an output end of the first seed conduit is connected to the first furrow opener and an input end of the first seed conduit is connected to the meter discharge such that during operation an open path is maintained through the first seed conduit between the meter discharge and the first furrow opener;

a second seed conduit, wherein an output end of the second seed conduit is connected to the second furrow opener and an input end of each second seed conduit is connectable to the meter discharge;

seeding the small seeds at the first row spacing by, in each dispensing apparatus, operating the singulating meter in the small meter seed mode and connecting the second seed conduit to the meter discharge to provide a path for the small seeds from the meter discharge to the second furrow opener;

seeding the large seeds at the second row spacing by, in each dispensing apparatus, operating the singulating meter in the large meter seed mode and disconnecting the input end of the second seed conduit from the meter discharge.

18. The method of claim 17 comprising, in each dispensing apparatus:

connecting a Y input opening of a Y fitting to the meter discharge, connecting the input end of the first seed conduit to a first Y output of the Y fitting and connecting the input end of the second seed conduit to a second Y output of the Y fitting;

closing the second Y output to seed the large seeds and opening the second Y output to seed the small seeds.

19. The method of claim 18 comprising, in each dispensing apparatus, directing a pressurized air stream through the meter discharge to the first and second furrow openers, and providing centering projections extending from an inner surface of the Y fitting between the Y input opening and the first and second Y output openings.

20. The method of claim 18 comprising, in each dispensing apparatus, providing a diversion plate and moving the diversion plate to a closed position to close the second Y output opening, and moving the diversion plate to an open position to open the second Y output opening.

21. The method of claim 20 comprising, in each dispensing apparatus, adjusting the diversion plate to intermediate positions partially blocking the second Y output opening.

22. The method of claim 17 comprising maintaining the second furrow openers above a ground surface when the selector is operated in the large selector seed mode.

* * * * *